United States Patent
Shin et al.

(10) Patent No.: US 8,852,379 B2
(45) Date of Patent: *Oct. 7, 2014

(54) METHOD FOR EXFOLIATING CARBONIZATION CATALYST FROM GRAPHENE SHEET, METHOD FOR TRANSFERRING GRAPHENE SHEET FROM WHICH CARBONIZATION CATALYST IS EXFOLIATED TO DEVICE, GRAPHENE SHEET AND DEVICE USING THE GRAPHENE SHEET

(75) Inventors: Hyeon Jin Shin, Suwon-si (KR); Jaeyoung Choi, Suwon-si (KR); Seonmi Yoon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 176 days.

This patent is subject to a terminal disclaimer.

(21) Appl. No.: 13/364,465

(22) Filed: Feb. 2, 2012

(65) Prior Publication Data
US 2012/0132357 A1     May 31, 2012

Related U.S. Application Data

(62) Division of application No. 12/358,830, filed on Jan. 23, 2009, now Pat. No. 8,133,466.

(30) Foreign Application Priority Data

Jun. 12, 2008    (KR) .................. 10-2008-0055310

(51) Int. Cl.
*B32B 37/02*      (2006.01)
*B32B 37/14*      (2006.01)
(Continued)

(52) U.S. Cl.
CPC ............... *B32B 43/006* (2013.01); *B01J 23/52* (2013.01); *B01J 23/70* (2013.01); *C01P 2004/24* (2013.01); *B82Y 40/00* (2013.01); *B01J 23/42* (2013.01); *B01J 23/16* (2013.01); *C01B 31/0446* (2013.01); *B01J 23/02* (2013.01); *C01B 31/0484* (2013.01); *C01B 2204/04* (2013.01); *B82Y 30/00* (2013.01); *Y10S 977/842* (2013.01)
USPC ............... 156/281; 423/448; 216/83; 156/60; 977/842

(58) Field of Classification Search
USPC ........ 423/448; 216/83; 156/60, 281; 977/842
See application file for complete search history.

(56) References Cited

U.S. PATENT DOCUMENTS 5,757,334 A    5/1998    Cobb
7,968,674 B2 *    6/2011    Choi et al. ..................... 528/485
(Continued)

FOREIGN PATENT DOCUMENTS

JP     2000-164326     6/2000

OTHER PUBLICATIONS

Reina et al; "Transferring and Identification of Single-and Few-Layer Graphene on Arbitrary Substrates" J Phys. Chem. C, vol. 112, No. 46, 2008, pp. 17741-17744.

(Continued)

*Primary Examiner* — Daniel C McCracken
(74) *Attorney, Agent, or Firm* — Cantor Colburn LLP

(57) ABSTRACT

A carbonization catalyst for forming graphene may be exfoliated from a graphene sheet by etching. A binder layer may be formed on the graphene sheet on which a carbonization catalyst is formed, to support and fix all or part of the graphene sheet. Further, the graphene sheet from which the carbonization catalyst is exfoliated may be transferred to a device. When exfoliating the carbonization catalyst from the graphene sheet, an acid may be used together with a wetting agent.

4 Claims, 3 Drawing Sheets

(51) Int. Cl.
*B82Y 40/00* (2011.01)
*C01B 31/04* (2006.01)
*B32B 43/00* (2006.01)
*B82Y 30/00* (2011.01)
*B01J 23/52* (2006.01)
*B01J 23/70* (2006.01)
*B01J 23/42* (2006.01)
*B01J 23/16* (2006.01)
*B01J 23/02* (2006.01)

(56) References Cited

U.S. PATENT DOCUMENTS 8,133,969 B2 * 3/2012 Choi et al. .......... 528/485
8,350,001 B2 * 1/2013 Choi et al. .......... 528/485

OTHER PUBLICATIONS

Fitzer et al; "Recommended terminology for the descriptopn of carbon as a solid" Pure & Appl. Chem, vol. 67, No. 3, 1995, pp. 473-506.

* cited by examiner

METHOD FOR EXFOLIATING CARBONIZATION CATALYST FROM GRAPHENE SHEET, METHOD FOR TRANSFERRING GRAPHENE SHEET FROM WHICH CARBONIZATION CATALYST IS EXFOLIATED TO DEVICE, GRAPHENE SHEET AND DEVICE USING THE GRAPHENE SHEET

CROSS REFERENCE TO RELATED APPLICATIONS

This application is a divisional of U.S. patent application Ser. No. 12/358,830, filed on Jan. 23, 2009, which claims priority to Korean Patent Application No. 10-2008-0055310, filed on Jun. 12, 2008, and all the benefits accruing therefrom under U.S.C. §119, the contents of which are hereby incorporated by reference in their entirety.

BACKGROUND

1. Field

This disclosure relates to a method for exfoliating a carbonization catalyst from a graphene sheet grown on the carbonization catalyst, a method for transferring the graphene sheet to a device, a graphene sheet from which a carbonization catalyst is exfoliated and a device comprising the graphene sheet.

2. Description of the Related Art

Graphite may be formed of a stacked structure of two-dimensional planar sheets in which carbon atoms may be bonded in an extended fused array of hexagonal rings. A single sheet of the extended fused array of six-membered carbon rings may be referred to as graphene.

Graphene sheet, as defined herein, may comprise one or more sheets of graphene. Graphene sheet may have advantageous properties different from those of other materials. In particular, electrons may move on the graphene sheet as if they have zero mass, which means that the electrons may move at the velocity at which light moves in vacuum. Electron mobility on graphene sheet has been found to be about 20,000 to 50,000 $cm^2/Vs$. Further, graphene sheet may exhibit unusual half-integer quantum hall effects for electrons and holes.

Since the electrical properties of graphene sheet with a given thickness may be changed depending on its crystal orientation, the electrical properties may be controlled by selecting the crystalline orientation of the graphene sheet and to this end, designing devices with different electrical properties using graphene sheet may be relatively straightforward. The electrical properties of graphene sheet may be compared with those of a carbon nanotube ("CNT"), which is known to exhibit metallic or semiconducting properties dependent upon the chirality and diameter of the CNT. A complicated separation process may be required in order to take advantage of such metallic or semiconducting properties of CNTs. Graphene sheet may also have economic advantages over CNTs in that because no purification may be needed, as with synthesized CNTs, graphene sheets may be less expensive. Therefore, graphene sheet may be widely used for carbon-based electrical or electronic devices.

Graphene sheets may be prepared generally by a micromechanical process or by a SiC crystal pyrolysis process.

A micromechanical process may be a method that may include, for example, attaching a tape onto a surface of a graphite sample, and releasing the tape from the surface by peeling, to obtain a graphene sheet adhered to the tape coming off the graphite. The tape may be then released from the graphene sheet by, for example, dissolving the tape in a solvent.

The SiC crystal pyrolysis process may be a method that may include, for example, heating a SiC single crystal to decompose SiC on the surface of the crystal. The Si may be removed after the decomposition, and the remaining carbon (C) may form the graphene sheet.

SUMMARY

A variety of novel techniques for manufacturing graphene sheets may be implemented by forming graphene on a carbonization catalyst using carbon source. Large-sized graphene sheets may be reproduced economically using these techniques.

In these techniques, graphene sheet may be easily damaged when exfoliating the graphene sheet from the carbonization catalyst after the graphene sheet is formed on the carbonization catalyst. Forming a binder layer on the graphene sheet may be used for preventing the damage of the graphene sheet which may occur when the carbonization catalyst is exfoliated from the graphene sheet.

Disclosed herein is, in an embodiment, a method for exfoliating a carbonization catalyst from a graphene sheet wherein the method may include forming a binder layer on the graphene sheet, wherein the binder layer may support and fix all or part of the graphene sheet formed on the carbonization catalyst, and exfoliating the carbonization catalyst from the graphene sheet.

Also in an embodiment, a method for transferring the graphene sheet from which a carbonization catalyst is exfoliated to a device may include forming a binder layer on a surface of a graphene sheet formed on a surface of a carbonization catalyst where the binder layer and carbonization catalysts may be on opposite surfaces of the graphene sheet, wherein the binder layer may support and fix all or part of the graphene sheet, exfoliating the carbonization catalyst from the graphene sheet, and transferring the graphene sheet from which the carbonization catalyst is exfoliated to a device.

In another embodiment, a graphene sheet may be obtained by forming a binder layer on a surface of the graphene sheet which is formed on a surface of a carbonization catalyst, where the binder layer and carbonization catalysts may be on opposite surfaces of the graphene sheet and the binder layer may support and fix all or part of the graphene sheet formed on the carbonization catalyst, and exfoliating the carbonization catalyst from the graphene sheet.

In another embodiment, a method of forming a device, may include forming a graphene sheet on a surface of a carbonization catalyst, forming a binder layer on a surface of the graphene sheet opposite the carbonization catalyst, wherein the binder layer supports and fixes all or part of the graphene sheet formed on the carbonization catalyst, exfoliating the carbonization catalyst from the graphene sheet, and transferring the graphene sheet to the device. In a further embodiment, a device may include the graphene sheet from which the carbonization catalyst is exfoliated by the aforesaid method.

BRIEF DESCRIPTION OF THE DRAWINGS

The above and other features and advantages of the disclosed embodiments will be more apparent from the following detailed description taken in conjunction with the accompanying drawings in which.

DETAILED DESCRIPTION

Figure 1:
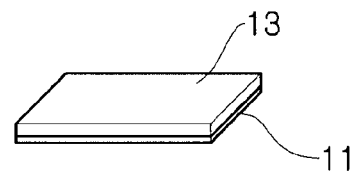
FIG. 1 is a schematic view of a carbonization catalyst formed to have a film shape and a graphene sheet, according to an exemplary embodiment.

The embodiments will be described more fully hereinafter with reference to the accompanying drawings, in which exemplary embodiments are shown. It will be appreciated that the invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the description, details of well-known features and techniques may be omitted to avoid unnecessarily obscuring the presented exemplary embodiments.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. The use of the terms "first", "second", and the like do not imply any particular order, but are included to identify individual elements. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements and shape, size and regions, and the like, are exaggerated for clarity.

FIG. 1 is a schematic view of a carbonization catalyst formed to have a film shape (referred to "carbonization catalyst film") and a graphene sheet according to an exemplary embodiment.

Referring to FIG. 1, graphene may be grown on a surface of a carbonization catalyst film 11 to form a graphene sheet 13.

In an embodiment, the carbonization catalyst may be, for example, at least one selected from the group consisting of Ni, Co, Fe, Pt, Au, Al, Cr, Cu, Mg, Mn, Mo, Rh, Si, Ta, Ti, W, U, V, Zr, and any combination thereof. And, the carbonization catalyst film may be either thin or thick where, when the carbonization catalyst film may be thin, it may have a thickness of about 1 to about 1,000 nm, or where the carbonization catalyst film may be thick, it may have a thickness of about 0.01 to about 5 mm.

Graphene may be formed on the surface of the carbonization catalyst by various methods. As for a non-limiting example of the methods, a chemical vapor deposition ("CVD") method of supplying a gaseous carbon source in the presence of a carbonization catalyst and carrying out heat-treatment to grow graphene on the carbonization catalyst may be used. In an embodiment, a carbonization catalyst may be formed to have a film shape and placed in a chamber without oxygen. Then, heat-treatment may be carried out at a temperature of, for example, about 300 to about 2,000° C. for about 1 second to about 1 hour while supplying a gaseous carbon source such as carbon monoxide, ethane, ethylene, ethanol, acetylene, propane, butane, butadiene, pentane, pentene, cyclopentadiene, hexane, cyclohexane, benzene, toluene, combinations thereof, or the like, at a flow of about 5 to about 1,000 standard cubic centimeters per minute (sccm), specifically about 10 to about 500 sccm, optionally in the presence of an inert gas such as nitrogen, helium, argon, or the like so as to form graphene. The carbon atoms of the carbon source may be bonded with each other to form stable fused planar hexagonal shapes with extended pi-electron systems, to produce the graphene sheet. A graphene sheet with a regular lattice structure may be obtained by cooling the produced graphene sheet (As for a non-limiting example, the cooling may include a natural cooling and the cooling rate may be 10~500° C. per minute). Though a CVD method was described above, methods of growing graphene on the carbonization catalyst may not be limited only to the CVD method.

In another exemplary embodiment, a carbonization catalyst may be contacted with a carbon source such as a liquid carbon-based material. Through a preliminary heat treating of the liquid carbon-based material, the liquid carbon-based material may be decomposed by the carbonization catalyst to liberate carbon. The carbon may be implanted into the carbonization catalyst, which is so called as carburized, and thus, graphene sheet may be formed on the carbonization catalyst layer. Non-limiting examples of the process for contacting the carbonization catalyst with the liquid carbon-based material may include immersing, etc. As for a non-limiting example of the liquid carbon-based material, an organic solution may be used. The liquid carbon-based material, however, is not limited to the organic solution and may include any liquid carbon-based material which may include carbon and be decomposed by the carbonization catalyst. As for non-limiting examples of the organic solution, polar or non-polar organic solutions having a boiling temperature of about 60 to about 400° C. may be used. As for non-limiting examples of the organic solution, alcohol-based organic solution, ether-based organic solution, ketone-based solution, ester-based organic solution, organic acid-based organic solution, etc. may be used. In terms of a reduction ability, a reactivity, an adsorption with carbonization metal catalyst, alcohol-based organic solution or ether-based organic solution may be used. In the preliminary heat treating, the liquid carbon-based material and the carbonization catalyst may be stirred to be sufficiently mixed with each other. As for a non-limiting example, the heat treating may be carried out at about 100 to about 400° C. for about 10 minutes to about 48 hours.

In another exemplary embodiment, a carbonization catalyst may be contacted with a carbon source such as a carbon-containing polymer in order to form a graphene sheet. The carbon-containing polymer is not limited to a specific carbon-containing polymer. As for a non-limiting example, self-assembly polymer may be used. Self-assembly polymer may be perpendicularly aligned in order on the carbonization polymer to form a self-assembly layer, which may help a high-dense graphene sheet made. As for a non-limiting example of the self-assembly polymer, at least one selected from the group consisting of amphiphilic polymer liquid crystal polymer, conductive polymer and any combination thereof may be used.

In other exemplary embodiments, any method for forming graphene on carbonization catalyst may be used as long as graphene is formed on carbonization catalyst. In this way, those skilled in the art will understand that the exemplary embodiments are not limited to a particular method of forming graphene on carbonization catalyst.

In an exemplary embodiment, the graphene sheet 13 refers to a sheet made of graphene. As for a non-limiting example of the graphene sheet, the graphene sheet may be formed of fused polycyclic aromatic rings with carbon atoms covalently bonded (normally $sp^2$-bonded). The covalently bonded carbon atoms may form 6-membered ring as a basic repeating unit, but 5- and/or 7-membered rings may further be formed. The graphene sheet may be a single layer of graphene or may comprise a multi-layered (up to about 300 layers) graphene. The graphene sheet may include various structures. The structure may be varied depending on the content of the 5- and/or 7-membered rings included in the graphene. In general, the side ends (i.e., the edges) of the graphene sheet may be saturated with hydrogen atoms.

In an exemplary embodiment, the graphene sheet 13 may be one having a large area with the length greater than or equal to about 1 mm, specifically about 1 mm to about 1,000 mm along the transverse and longitudinal directions. Further, the graphene sheet 13 may desirably have a homogeneous structure with few defects.

Figure 2:
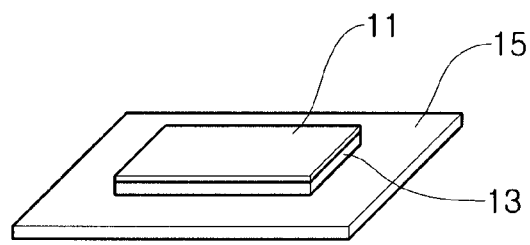
FIGS. 2 and 3 are schematic views of a binder layer formed on a graphene sheet, according to an exemplary embodiment.
Figure 3:
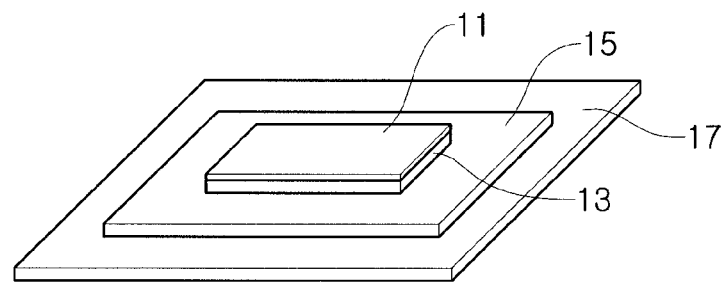

FIGS. 2 and 3 are schematic views of a binder layer formed on a surface of a graphene sheet according to an exemplary embodiment. A binder layer 15 may be formed on a surface of the graphene sheet 13 on the surface opposite the carbonization catalyst film 11 (see FIG. 2). On a surface of the binder layer 15 opposite the graphene sheet 13, a substrate 17 may further be formed, if necessary (see FIG. 3). As for non-limiting examples of the substrate, a plastic substrate such as a PET substrate may be used. As for non-limiting examples of the method forming the substrate, the substrate may be formed on the binder material before the binder material coated on the graphene sheet is cured. Further, after the binder material is coated on the graphene sheet, the substrate may be further disposed on the surface of the binder layer opposite the graphene sheet before the binder material is cured.

Though the binder layer 15 may be formed to cover the entire surface of the graphene sheet 13 as in FIGS. 2 and 3, the binder layer may also be formed to cover only a portion of the graphene sheet 13.

Hereinafter is given a detailed description of the binder layer 15.

The graphene sheet may be transferred to a device in order to use the graphene sheet in the device. It may be necessary to exfoliate the carbonization catalyst film 11 on which graphene has grown. The carbonization catalyst film 11 on which graphene has grown may be exfoliated by wet etching or dry etching. In an embodiment, for example, where wet etching is used, the carbonization catalyst film 11 may be exfoliated by reaction with an acid, which acts as an etchant. In the process of exfoliating the carbonization catalyst film 11, there may be a risk that the graphene sheet 13 formed on the carbonization catalyst film 11 may be damaged. The graphene sheet 13 formed on the carbonization catalyst film 11 may also be vulnerable to external vibration or chemical substances, where such vulnerability may increase if the graphene sheet 13 is thinner.

Thus, in order to prevent possible damage of the graphene sheet 13 during the exfoliation of the carbonization catalyst film 11, the binder layer 15, which may support and fix the graphene sheet 13, may be formed to cover all or part of surface of the graphene sheet 13. The binder layer 15 may thus serve to not only support the graphene sheet 13 but also to fix the graphene sheet 13, i.e., to bind the graphene sheet 13. Since the graphene sheet may be fixed, rolling up of the graphene sheet, which may occur when the graphene sheet is exposed to a solvent, may be prevented. For example, when the graphene sheet is exposed to a solvent, the graphene sheet may have a difference in polarity with the solvent (e.g., where the graphene is nonpolar and the solvent is a polar solvent) so that the graphene sheet may roll up when changed from one environment to another where the graphene interacts with itself in preference to the solvent, and forms a rolled structure as a more stable structure. In an embodiment, the graphene sheet may not be rolled upon exposure to air after exfoliating.

As for non-limiting examples of the binder material that may be used for the binder layer 15, an insulating binder material such as a siloxane-based compound, an acryl-based compound, an epoxy-based compound, and the like may be used. Further, a conductive polymer, a polymer electrolyte material, a photoresist ("PR") material, a metal paste, and the like may be used as the binder material.

Non-limiting examples of the siloxane-based compound may include, for example, polydimethylsiloxanes ("PDMS"), polydiphenylsiloxanes ("PDPS"), polysilsesquioxanes ("PSQ"), copolymers thereof, combinations thereof, and the like.

Non-limiting examples of the acryl-based compound may include poly(methyl methacrylate) ("PMMA"), poly(ethyl methacrylate) ("PEMA"), poly(butyl methacrylate) ("PBMA"), poly(isobutyl methacrylate) ("PIBMA"), copolymers thereof, combinations thereof, and the like.

Non-limiting examples of the epoxy-based compound may include epoxy resin, and the like. For reference, epoxy resin may be produced from condensation polymerization of bisphenol A and epichlorohydrin, and various epoxy resins may be obtained depending on the proportion of the two monomers and/or the molecular weight of the polymer produced.

Non-limiting examples of the conductive polymer may include polyacetylene, polypyrrole, polyaniline, polythiophene, copolymers thereof, combinations thereof, and the like.

Non-limiting examples of the polymer electrolyte material may include polyphosphagen, and the like.

Non-limiting examples of the photoresist material may include various photosensitive polymers such as cinnamic acid polyvinyl ester, and the like. Commercial photoresist materials may be used, such as for example, AZ 111 (available from Micro Chem).

Non-limiting examples of a metal paste may include Ag paste, and the like.

Because the carbonization catalyst film 11 may be exfoliated by an etchant (e.g., an acid) as described above, the binder layer 15 per se may also be exposed to the etchant. In order for the binder layer 15 to fully serve as a binder of the graphene sheet, the binder layer 15 may, in some embodiments, be chemically resistant to the etchant, and in other embodiments, may be controllably etched (i.e., damaged) by the etchant. Where controlled etching of the binder is desired, it may be available to control the damage of the binder layer 15 due to the etchant (i.e., the dissociation and/or discoloration of the polymer in the binder layer due to the acid) to be about 50% of the thickness of the binder layer 15 or less. Further, it may be available to control the damage of the binder layer 15 due to the etchant to be about 0% to about 10% of the thickness of the binder layer. For example, when the polymer in the binder layer dissociates (i.e, reacts with and/or dissolves) into the etchant, the etch rate of the carbonization catalyst film 11 may decrease.

The etchant damage may be evaluated by various methods. As for a non-limiting example, the etchant damage may be evaluated as the percentage ratio of time required for etching where the binder layer 15 is used, to the time required for etching where the binder layer 15 is not used. For example, for purposes of explanation, an etch process may take about 10 hours for etching when the binder layer 15 is not used. Similarly, also for purposes of explanation, in two exemplary instances a binder layer 15 is used, where the etching times required for etching are respectively about 18 hours and about 11 hours. In this instance, the damage of the binder layer of the two exemplary cases may be evaluated to be about 80% [((18 h.−10 h.)/10 h.)×100] and about 10% [((11 h.−10 h.)/10 h.)×100], respectively. If the damage of the binder layer may be about 0%, it may further mean that there may be no discoloration in addition to the fact that the etching time is the same as when the binder layer is not used.

For example, when the siloxane-based compound or the acryl-based compound is used as the binder material, the etchant damage may be about 0%. When the epoxy-based compound, the conductive polymer, the photoresist material or the metal paste is used as the binder material, the etchant damage may be less than or equal to about 10%. And, when the polymer electrolyte material is used as the binder material, the etchant damage may be less than or equal to about 80%.

It may be possible for the binder layer 15 to sufficiently support the graphene sheet 13 during the exfoliation of the carbonization catalyst film 11. For the purpose, it may be possible that the binder layer 15 may be in a cured state. Therefore, a curable material (e.g., a material that may be cured by heat, UV, and the like) may be used for the binder layer 15. For example, the siloxane-based compound, the acryl-based compound, the conductive polymer, the photoresist material, and the like, may each be curable materials.

After the carbonization catalyst film 11 is exfoliated, the binder layer 15 may be either removed or not removed from the graphene sheet 13 to be applied to a device.

Removal of the binder layer 15, where desired, may be carried out using a solvent (e.g., an organic solvent where non-limiting examples of the organic solvent may include ketone-based or alcohol-based organic solvent). Thus, where the binder layer 15 is to be removed, the binder layer 15 may be formed of a material that may dissociate into (i.e., dissolve in) the solvent for easier removal of the binder layer 15. For example, the acryl-based compound or the photoresist material may be dissociable in this way (i.e., soluble). In contrast, the siloxane-based compound, the epoxy-based compound, the conductive polymer or the polymer electrolyte material may not be dissociable (i.e., insoluble), as such materials may be thermosetting and therefore solvent resistant after cure.

Where the binder layer 15 is not removed from the graphene sheet 13, the binder layer 15 may need to be transparent depending on the device type. For the purpose, the binder layer 15 may be formed of a transparent material. For example, a binder layer made of the siloxane-based compound may exhibit a transparency of up to about 100% (i.e., having up to about 100% of incident light transmittance through the binder layer). Binder layer made of the acryl-based compound, the epoxy-based compound and the polymer electrolyte material may exhibit a transparency of greater than or equal to about 90%, greater than or equal to about 80%, and greater than or equal to about 70%, respectively. In contrast, a binder layer made of the conductive polymer may be colored, which though dependent on the thickness of the binder layer, may exhibit a transparency of less than about 50% in a given specific region of the visible light spectrum.

The binder layer 15 may have a thickness of greater than or equal to about 1,000 Å. Reduction of the thickness of the binder layer 15 to be less than about 1,000 Å may become increasingly difficult. Thought there may be no particular requirement for an upper limit for the thickness of the binder layer 15, as for a non-limiting example, the binder layer may be 1000 Å~10 μm. For another non-limiting example, the binder layer may be 5000 Å~1 μm. The concrete thickness may be varied according to the concrete applications. If the binder layer 15 is formed to support and fix a part of graphene sheet 13, the part may be chosen in order for the graphene sheet to be prevented from rolling when the graphene sheet is exposed to a solvent. As for non-limiting examples such as an example 7 of below described experiment 1, if the binder material is coated to overlap the edge of the nickel plate and the graphene sheet in order for the binder layer to support and fix the graphene sheet at its edge portion, the binder layer may be formed to have an area of 4~16% of total graphene sheet area (the same as the area of the catalyst layer) at the edge portion of graphene sheet or to have an area of less than 20% of total graphene sheet area (the same as the area of the catalyst area) at the periphery of the graphene sheet.

Figure 4:
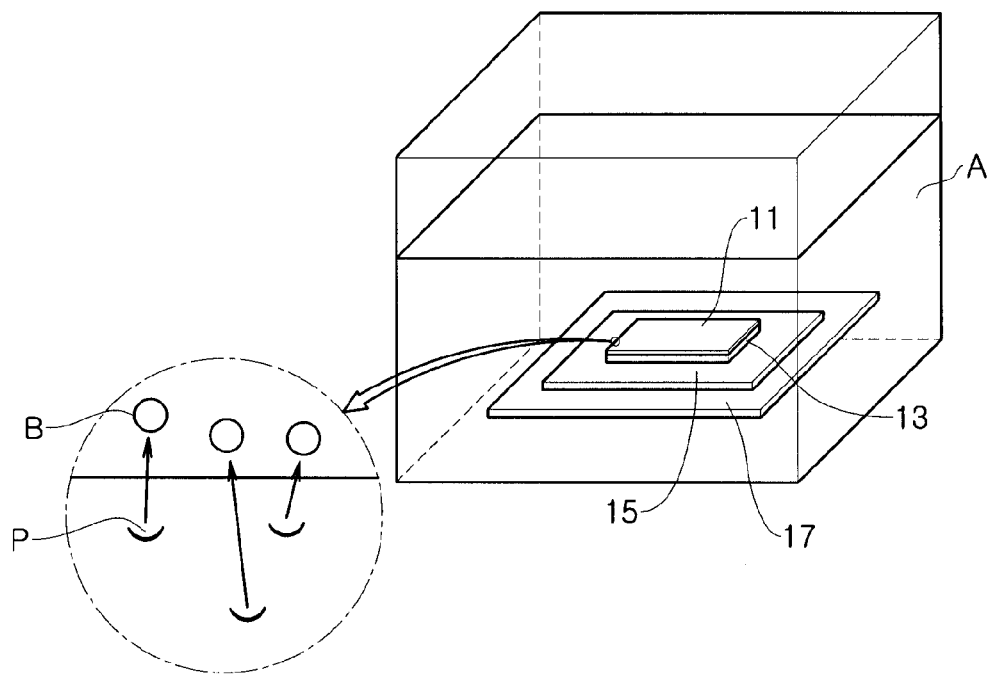
FIG. 4 is a schematic view of a wet etching process for exfoliating a carbonization catalyst, according to an exemplary embodiment.

FIG. 4 is a schematic view of a wet etching process for exfoliating a carbonization catalyst according to an exemplary embodiment.

FIG. 4 shows that a laminate comprising the carbonization catalyst film 11, the graphene sheet 13 formed on a surface of the catalyst film 11, the binder layer 15 formed on a surface of the graphene sheet 13 opposite catalyst film 11, and the substrate 17 disposed on a surface of the binder layer 15 opposite graphene sheet 13 may be immersed in an acid etching solution A for exfoliating the carbonization catalyst. Herein, though FIG. 4 shows the laminate of FIG. 3 immersed in acid solution A, it will be understood that, in an alternate exemplary embodiment, the laminate of FIG. 2 may be also immersed in the acid solution A.

The carbonization catalyst film 11 may be, in the exemplary embodiment, exfoliated by the acid solution A. The acid of the acid solution may be, for example, a strong acid such as $H_2SO_4$, $HNO_3$, $H_3PO_4$, HCl, any combination thereof, or the like. In an embodiment, where the carbonization catalyst is Ni for example, the chemical process by which carbonization catalyst is exfoliated by the acid solution may be shown in the following Reaction Formula 1.

$$Ni(s)+2H^{+}+SO_4^{-}[\text{or } H^{+}+NO_3^{-}, 3H^{+}+PO_4^{3-}, H^{+}+Cl^{-}, \text{etc.}] \rightarrow NiSO_4[\text{or } Ni(NO_3)_2, Ni_4(PO_4)_3, Ni(Cl)_2, \text{etc.}]+H_2(g)$$

Reaction Formula 1

Because the carbonization catalyst film 11 may have a large thickness as well as a large area, the etching rate during the wet etching may be different depending on the position on the carbonization catalyst film 11 where the etch rate is measured. As a result, differences in etching rate across the carbonization catalyst film 11 may result in damage to the graphene sheet. Accordingly, it may be available to control the etching rate across the carbonization catalyst film 11 uniformly.

Referring again to FIG. 4, bubbles B [hydrogen, air, or other gas] and pits P in the surface of the carbonization catalyst film 11 may be generated as the acid solution A reacts with the carbonization catalyst. This reaction may occur very vigorously. This may mean that it may be possible to control the etching rate across the carbonization catalyst film 11 uniformly through controlling the generation of the bubbles B and the pits P during the exfoliation reaction.

In an exemplary embodiment, a wetting agent may be used to control the etching rate across the carbonization catalyst film 11 uniformly and to further prevent damage of the graphene sheet since the wetting agent may be used for controlling the generation of the bubbles B and the pits P during the exfoliation of the carbonization catalyst film 11. That is, the wetting agent may reduce the contact angle between the bubbles B and the carbonization catalyst film 11 and help the bubbles B to be removed before they grow into a large size enough to generate the pits P in the surface of the carbonization catalyst film 11.

Figure 5:
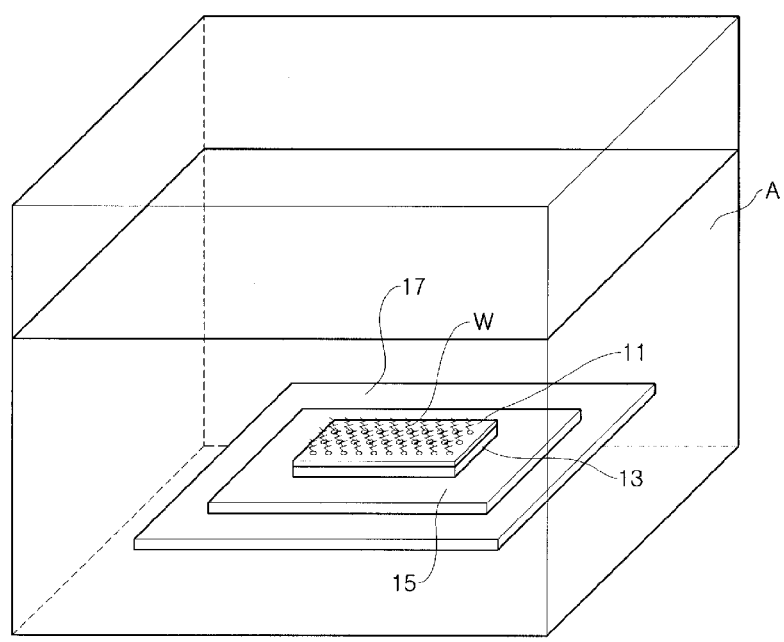
FIG. 5 is a schematic view showing a wetting agent further added to the acid etching solution in FIG. 4.

FIG. 5 is a schematic view showing the effect of a wetting agent added to the acid etching solution in FIG. 4.

Referring to FIG. 5, a wetting agent compound W may bond to the carbonization catalyst film 11. Since the wetting agent compound as bonded to the surface of the carbonization catalyst film 11 in FIG. 5 is merely presented in a simplified or exaggerated manner, it will be understood that the individual molecules of wetting agent are not represented in their actual size, shape or bonding state.

To prevent bubbling and pitting in the carbonization catalyst film 11, it may be available to use a linear carbon compound as the wetting agent W in preference to a branched carbon compound.

In an embodiment, a non-limiting examples of the wetting agent W include, but are not limited to, a sulfate, sulfonate, carboxylate, phosphate, nitrate, or the like. In an exemplary embodiment, a sulfonate or sulfate may be used.

In an embodiment, non-limiting examples of sulfonate and sulfate include a $C_8$-$C_{18}$ normal primary alcohol sulfate, a $C_{10}$-$C_{19}$ aromatic substituted benzene sulfonate, combinations thereof, and the like.

In an embodiment, non-limiting examples of sulfonate and sulfate include sodium lauryl sulfate, sodium monolaurin monosulfate, lauric acid monoester of diethylene glycol sulfoacetate sodium salt, dodecyloxymethanesulfonate, any combinations thereof, and the like.

Use of insufficient amounts of the wetting agent may result in damage to a larger area of the graphene sheet during the exfoliation of the carbonization catalyst. To prevent damage to the graphene sheet, it may be available to include the content of the wetting agent in an amount of about 0.1 wt % to about 0.5 wt % of the total weight of the solution. In an embodiment, effective prevention of the damage of the graphene sheet, may be provided by use of, for example including the wetting agent in an amount of about 0.3 wt %. Use of wetting agent in an amount greater than 0.5 wt % may not result in any additional damage-preventing, despite increasing the amount of the wetting agent.

Figure 6:
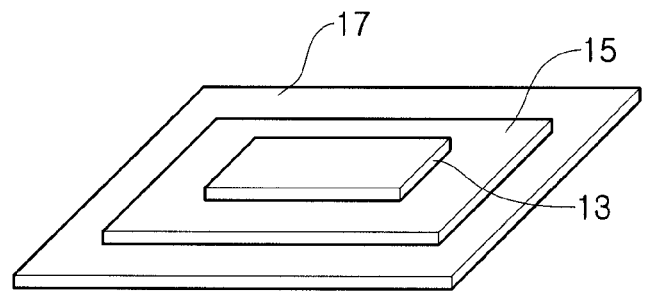
FIG. 6 is a schematic view of the graphene sheet of FIG. 5 removed from the etching solution.

FIG. 6 is a schematic view of the graphene sheet of FIG. 5 after removing from the etching solution (i.e., after exfoliation).

FIG. 6 shows the graphene sheet 13, the binder layer 15 disposed on a surface of the graphene sheet 13, and the substrate 17 disposed on a surface of the binder layer 15 opposite the graphene sheet 13. As shown in FIG. 6, the carbonization catalyst 11 (not shown in FIG. 6) has been exfoliated from the graphene sheet 13.

Figure 7:
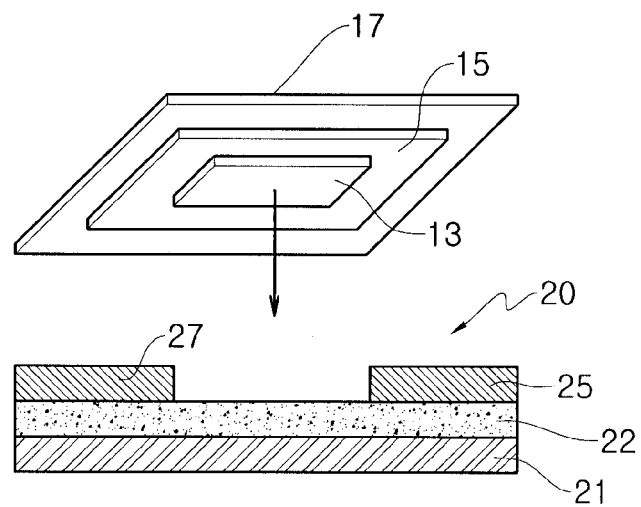
FIG. 7 is a schematic view of a process of transferring the graphene sheet of FIG. 6 to a device.

FIG. 7 is a schematic view of a process for transferring the graphene sheet of FIG. 6 from which the carbonization catalyst is exfoliated to a device.

In FIG. 7, in an embodiment, a field-effect transistor 20 is illustrated in an exploded view to exemplify the device. The field-effect transistor 20 may include an insulating layer 22 formed on a surface of back gate 21. A drain electrode 25 and a source electrode 27 may each be formed on a surface of the insulating layer 22 opposite back gate 21. In fabricating the device, the graphene sheet 13 may be transferred to the region between the drain electrode 25 and the source electrode 27 (shown by the arrow in FIG. 7).

Though FIG. 7 illustrates a process of transferring the graphene sheet to a device, it will be understood to the skilled in the art that the graphene sheet 13 does need not necessarily be transferred. For example, in another embodiment, the graphene sheet 13 may be cut into a selected shape or may be rolled to have a tube form for a specific use. A graphene sheet so processed may also be used where coupled with a desired object.

As described above, when exfoliating a carbonization catalyst from a graphene sheet on which the carbonization catalyst has grown, the graphene sheet may be obtained without damage and may be readily transferred to a desired device by forming a binder layer which may support and fix the graphene sheet. Thus obtained graphene sheet may have a larger area than the graphene sheet obtained through other physical methods and may be useful in various applications including transparent electrodes, conducting thin films, hydrogen storage media, optical fibers, electronic devices, and the like. Further, since thus obtained graphene sheet may be not self-rolling even after it is exposed to the air, the graphene sheet may be useful in the various applications. Non-limiting exemplary ways evaluating the extent of damage to a graphene sheet includes using photographs of the damaged graphene sheet. For example, after taking a photograph of the damaged graphene sheet, if the graphene sheet is shown to have a damage such as a hole around the center of the graphene sheet in the photograph, the damage extent may be evaluated from the ratio of the damaged area, i.e., the hole area to the catalyst layer area (=the whole graphene sheet area before its damage). If a part of the graphene sheet is shown to be cut out in the photograph, the damage extent may be evaluated from the ratio of the damaged area i.e., the cut-out area to the catalyst layer area (=whole graphene sheet area before its damage). As for non-limiting examples, the damaged area may be estimated by enlarging the damaged area in the photograph and multiplying a total number of minute unit areas having a shape such as square (not limited to the square shape) filled without margin into the damaged area by the unit area. The shape and/or size of the unit area may be varied considering the complexity of the shape of the damaged part.

The invention will now be described in further detail with reference to the following examples. The following examples and experiments are for illustrative purposes only and not intended to limit the scope of the claimed invention.

Experiment 1

Variation in Composition of Binder Layer

An about 0.5 mm-thick nickel plate with a size of about 1.2 cm×about 1.5 cm is prepared as a film-shaped carbonization catalyst. The nickel plate is positioned in a chamber, and heat-treated at about 1,000° C. for about 5 minutes using a halogen lamp heater while supplying acetylene gas into the chamber at a constant rate of about 200 sccm in order to form graphene on the film-shaped carbonization catalyst (i.e., on the nickel plate).

Subsequently, after removing the heater, the inside of the chamber is cooled rapidly. Graphene is thus grown to have a uniform spatial arrangement, and in this way an about 10-layered graphene sheet with a size of about 1.2 cm×about 1.5 cm is obtained.

On the about 10-layered graphene sheet, a coating layer of a binder material and a substrate (PET) are formed. The binder layers are formed to have a thickness of about 1 μm.

The coating of the binder material is carried out so that the binder material cover the graphene sheet in whole or in part, on the surface opposite the nickel plate. In Example 1 through Example 6 of this experiment, the binder material is coated to cover the entire surface of the graphene sheet, on the surface opposite the nickel plate, and then cured.

In Example 7, the binder material is coated to overlap the edge of the nickel plate and the graphene sheet, in order for the binder material to support and fix the graphene sheet at its edge portion (about 0.1 cm in width around the periphery of the graphene sheet). In Example 7, the nickel plate is placed on a polyethylene terephthalate (PET) substrate with the graphene sheet oriented cofacially with the PET substrate so that the PET substrate contacted the graphene sheet. Subsequently, the binder material (e.g., Ag paste as described below) is applied at the edge portion of the nickel plate and the graphene sheet and then cured, which enables only the edge portion of the graphene sheet to be supported and fixed by the binder material. It may be necessary to take care in applying the binder to prevent the binder material from entering the region of contacting surfaces between the graphene sheet and the substrate. Once the nickel plate is exfoliated, the corresponding edge portion may be cut off so as not to be used afterward together with the graphene sheet.

For the binder material, a siloxane-based compound (PDMS, SYLGARD® 184, Dow Corning) [Example 1], an acryl-based compound (PMMA; poly(methyl methacrylate), Mw=about 2,480,000, FLUKA) [Example 2], an epoxy resin (EPICON® HP-820, DIC) [Example 3], a conductive polymer (poly(3-hexythiophene), regioregular P3HT, Aldrich) [Example 4], a polymer electrolyte material (poly(sodium 4-styrenesulfonate), Aldrich) [Example 5], a photoresist material (AZ-111 photoresist, MicroChem) [Example 6] and an Ag paste (Fujikura Kasei. Co. Ltd.) [Example 7] are used. In Comparative Example, a binder layer is not formed. Subsequently, the laminate comprising the carbonization catalyst, the graphene sheet and the binder layer is immersed in an about 30% (v/v) aqueous $HNO_3$ solution for about 24 hours to exfoliate the nickel catalyst. In all Examples and Comparative Example, about 0.3 wt % (sat.) potassium perfluorooctanesulfonate is used as a wetting agent.

Damage of the binder layer due to the acid, curability, dissociability and transparency are evaluated as the examples and comparative example.

As described above, the damage of the binder layer due to the acid may be represented as a percentage ratio of the increased etching time to the time required for etching in the case that the binder is not used. Further, as described, if the damage of the binder layer is about 0%, it may further mean that there may be no discoloration of the graphene sheet caused by over etching, where the etching time is the same as when the binder layer is not used.

Curability and dissociability are evaluated as follows.

Curability is evaluated by visual observation with the unaided eye, when another film (for example, PET film) is attached to the surface on which the binder is coated and then detached therefrom, to determine whether the binder is adhered to the film. Dissociability is evaluated by observing visually whether the binder dissolved in acetone.

Transparency is evaluated by measuring light transmittance using a spectrophotometer.

The experiment result is given in the following Table 1.

TABLE 1

| | Damage to binder layer | Curability[1] | Dissociability[2] | Transparency |
|---|---|---|---|---|
| Example 1 | About 0% | ○ | X | About 100% |
| Example 2 | About 0% | ○ | ○ | About 95% (Transparency may be varied according to thickness and may have a value greater than about 90%) |
| Example 3 | About 10% | Δ | X | About 85% (Transparency may be varied according to thickness and may have a value greater than about 80%) |
| Example 4 | About 10% | X | X | About 50% (Transparency may be varied according to thickness and may have a value less than about 50%) |
| Example 5 | About 80% | ○ | X | About 70% (Transparency may be varied according to thickness and may have a value greater than about 70%) |
| Example 6 | About 10% | ○ | ○ | Binder layer removed |
| Example 7 | About 10% | ○ | X | Irrelevant (Binder is used only at the edge portion) |

[1]○: not adhered to the film, Δ: partly adhered to the film, X: adhered to the film.
[2]○: dissolved in acetone, X: not dissolved in acetone.

Damage to the graphene sheet after transferring to a device is evaluated. After exfoliation of the nickel plate, the relative area of the damaged graphene sheet is estimated as a percentage ratio of the damaged area to the total area of the graphene sheet area (i.e. the area of the nickel plate). The result is given in the following Table 2.

TABLE 2

| Example 1 | About 2% |
| --- | --- |
| Example 2 | About 5% |
| Example 3 | About 5% |
| Example 4 | About 25% |
| Example 5 | About 30% |
| Example 6 | About 20% |
| Example 7 | About 5% |
| Comparative Example | About 60% |

As seen in Table 2, the damage to the graphene sheet is prevented when the binder layer is used (Examples) as compared with Comparative Example. The damage to the graphene sheet is smaller when a binder layer with less damage due to acid (for example, about 10%, or about 0%) is used.

Meanwhile, when only the edge portion is fixed (Example 7), the damage of the graphene sheet is also small.

In the Comparative Example, rolling of the graphene sheet is observed when the graphene sheet is exposed to air after removal from the etchant solution. Further, damage (tearing) takes place where there is a vibration or contact with the substrate.

Experiment 2

Inclusion of Wetting Agent

A graphene sheet is obtained in the same manner of Example 1 of Experiment 1, except for the differences in the wet etching step as noted hereinbelow.

As etchant solution for wet etching, about 55 ml, about 40 ml and about 25 ml of about 60 wt % nitric acid ($HNO_3$) solutions are prepared. Potassium perfluorooctanesulfonate (wetting agent) of the following Chemical Formula 1 is added to nitric acid (sat.) to prepare about 15 ml, about 30 ml and about 55 ml of etching solutions having about 0.5 wt % wetting agent.

[Chemical Formula 1]

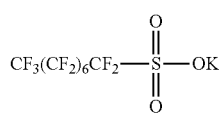

The volume of water is fixed at about 45 ml, and the volume of the wetting agent solution and the about 60 wt % nitric acid solution is controlled as in the following Table 3 in order to control the concentration of the wetting agent in the entire etchant solution.

Damage of the graphene sheet is evaluated for Examples 1 to 4 (measured 1 day after beginning etching). As in Experiment 1, after exfoliation of the nickel plate, the area of the damaged graphene sheet is calculated as percentage ratio of the damaged part to the graphene sheet area (i.e. area of the nickel plate). The result is given in the following Table 4.

TABLE 4

| Example 1 | About 5% |
| --- | --- |
| Example 2 | About 25% |
| Example 3 | About 50% |
| Example 4 | About 60% |

As seen in Table 4, where the concentration of the wetting agent was lower (Example 3), there is more damage to the graphene sheet during the exfoliation of the catalyst. When no wetting agent is used (Example 4) the damage reached about 60% or more beyond about 50%. Accordingly, it may be said that the damage of the graphene sheet may be further reduced by increasing the amount of the wetting agent.

While the invention has been shown and described with reference to certain exemplary embodiments thereof, it will be understood by those skilled in the art that various changes in form and details may be made thereto without departing from the spirit and scope of the invention as defined by the appended claims.

In addition, modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method for transferring a graphene sheet from which a carbonization catalyst is exfoliated to a device comprising: forming a binder layer on a surface of a graphene sheet formed on a surface of a carbonization catalyst where the binder layer and carbonization catalysts are on opposite surfaces of the graphene sheet, wherein the binder layer supports and fixes all or part of the graphene sheet; exfoliating the carbonization catalyst from the graphene sheet; and transferring the graphene sheet from which the carbonization catalyst is exfoliated to a device.

2. The method according to claim 1, where the binder layer is removed from the graphene sheet.

3. The method according to claim 1, wherein exfoliating the carbonization catalyst is accomplished with an acid and a wetting agent.

4. The method according to claim 1, wherein a substrate is further formed on a surface of the binder layer opposite the

TABLE 3

|  | Example 1 | Example 2 | Example 3 | Example 4 |
| --- | --- | --- | --- | --- |
| Nitric acid solution (about 60 wt %) | — | About 25 ml | About 40 ml | About 55 ml |
| Wetting agent solution [about 0.5 wt % wetting agent in nitric acid (sat.)] | About 55 ml | About 30 ml | About 15 ml | — |
| Water | About 45 ml | About 45 ml | About 45 ml | About 45 ml |
| Concentration of nitric acid in the etching solution | About 33 wt % | About 33 wt % | About 33 wt % | About 33 wt % |
| Concentration of wetting agent | About 0.275 wt % | About 0.15 wt % | About 0.075 wt % | About 0 wt % | graphene sheet before or after the binder layer is formed on the surface of the graphene sheet.

\* \* \* \* \*